United States Patent
Cochrane et al.

(10) Patent No.: US 8,930,325 B2
(45) Date of Patent: Jan. 6, 2015

(54) GENERATING AND UTILIZING A DATA FINGERPRINT TO ENABLE ANALYSIS OF PREVIOUSLY AVAILABLE DATA

(75) Inventors: Kristen E. Cochrane, Chicago, IL (US); Ivan M. Milman, Austin, TX (US); Martin Oberhofer, Bondorf (DE); Donald A. Padilla, Albuquerque, NM (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/396,821

(22) Filed: Feb. 15, 2012

(65) Prior Publication Data

US 2013/0212072 A1    Aug. 15, 2013

(51) Int. Cl.
  *G06F 17/00*    (2006.01)
(52) U.S. Cl.
  USPC ........... 707/691; 707/687; 707/758; 711/189; 714/100; 726/26
(58) Field of Classification Search
  None
  See application file for complete search history.

(56) References Cited

U.S. PATENT DOCUMENTS

| | | | |
|---|---|---|---|
| 6,216,229 B1 | 4/2001 | Fischer | |
| 6,336,175 B1 * | 1/2002 | Shaath et al. | 711/163 |
| 7,536,524 B2 * | 5/2009 | Shaath et al. | 711/163 |
| 7,617,393 B2 | 11/2009 | Betz et al. | |
| 7,739,315 B2 * | 6/2010 | Haga | 707/812 |
| 7,886,359 B2 | 2/2011 | Jones et al. | |
| 7,895,403 B1 * | 2/2011 | Tormasov et al. | 711/154 |
| 2002/0073138 A1 | 6/2002 | Gilbert et al. | |
| 2002/0099949 A1 | 7/2002 | Fries et al. | |
| 2004/0260929 A1 * | 12/2004 | Albornoz et al. | 713/176 |
| 2007/0078762 A1 | 4/2007 | Triola | |
| 2007/0118479 A1 | 5/2007 | Halsema et al. | |
| 2007/0192630 A1 | 8/2007 | Crane et al. | |
| 2007/0276843 A1 * | 11/2007 | Lillibridge et al. | 707/100 |
| 2008/0270802 A1 | 10/2008 | Ashley et al. | |

(Continued)

FOREIGN PATENT DOCUMENTS

| | | |
|---|---|---|
| EP | 1939785 A2 | 2/2008 |
| JP | 2006011738 | 1/2006 |

(Continued)

OTHER PUBLICATIONS

Bauer et al, "Secure Data Deletion for Linux File Systems", 2001.*

(Continued)

*Primary Examiner* — Hung Le
(74) *Attorney, Agent, or Firm* — Ingrid Foerster; Edell, Shapiro & Finnan, LLC (57) ABSTRACT

According to one embodiment of the present invention, a system analyzes data in response to detecting occurrence of an event, and includes a computer system including at least one processor. The system maps fields between the data and a fingerprint definition identifying relevant fields of the data to produce a fingerprint for the data. The data is deleted after occurrence of the event. The produced fingerprint is stored in a data repository, and retrieved in response to detection of the event occurrence after the data has been deleted. The system analyzes the retrieved fingerprint to evaluate an impact of the event on corresponding deleted data. Embodiments of the present invention further include a method and computer program product for analyzing data in response to detecting occurrence of an event in substantially the same manner described above.

18 Claims, 4 Drawing Sheets

(56) References Cited

U.S. PATENT DOCUMENTS

| | | | |
|---|---|---|---|
| 2009/0113545 | A1 | 4/2009 | Pic et al. |
| 2009/0249082 | A1 | 10/2009 | Mattsson |
| 2009/0299994 | A1 | 12/2009 | Krishnamurthy et al. |
| 2009/0327702 | A1 | 12/2009 | Schnell |
| 2010/0027780 | A1 | 2/2010 | Jung et al. |
| 2010/0088528 | A1* | 4/2010 | Sion .............................. 713/193 |
| 2010/0142713 | A1 | 6/2010 | Perlman |
| 2010/0199098 | A1 | 8/2010 | King |
| 2010/0325441 | A1 | 12/2010 | Laurie et al. |
| 2011/0035414 | A1 | 2/2011 | Barton et al. |
| 2011/0060607 | A1 | 3/2011 | Kesselman et al. |
| 2011/0099200 | A1* | 4/2011 | Blount et al. ................. 707/770 |
| 2011/0126274 | A1 | 5/2011 | Sadeckas |
| 2012/0198235 | A1* | 8/2012 | Kotla et al. ................... 713/171 |
| 2013/0036097 | A1* | 2/2013 | Mutalik et al. ............... 707/690 |
| 2013/0036098 | A1* | 2/2013 | Mutalik et al. ............... 707/690 |

FOREIGN PATENT DOCUMENTS

| | | | |
|---|---|---|---|
| JP | 2006039945 | A | 2/2006 |
| WO | 2008069825 | A3 | 6/2008 |
| WO | 2008128926 | A1 | 10/2008 |

OTHER PUBLICATIONS

Paul et al, "Proof of Erasability for Ensuring Comprehensive Data Deletion in Cloud Computing", 2010.*

Ashley et al., "From Privacy Promises to Privacy Management, A New Approach for Enforcing Privacy Throughout an Enterprise", Proceedings of the 2002 Workshop on New Security Paradigms, Sep. 2002, 8 pages.

Code Green Networks, Inc., "Complete Data Loss Prevention from Code Green Networks", Technology Brief, 8 pages, 2010, http://www.codegreennetworks.com/resources/downloads/TrueDLP_Brochure.pdf, pp. 1, 3-7.

Code Green Networks, Inc., "The Code Green Networks Content Security Solution Protecting Confidential Information in the Digital Age", Solution Overview White Paper, 12 pages, 2006, http://www.codegreennetworks.com/resources/downloadswp_technical_overview.pdf, pp. 1, 4-9.

McAfee, Inc., "Protecting and Securing Privacy Data and Sensitive Information in Today's Healthcare Organization", 4 pages, 2009, http://www.mcafee.com/cf/resources/solution-briefs/sb-protect-secure-data-healthcare.pdf.

Dataguise, Inc., "Steps to Discovery and Protection of Sensitive Data: Find IT. Search IT. Mask IT", White Paper, 12 pages, 2010, http://dataguise.com/pdf/STEPS_TO_DISCOVERY_WPv10.pdf.

International Search Report corresponding to PCT/CA2013/050103, dated May 21, 2013, 9 pages.

* cited by examiner

GENERATING AND UTILIZING A DATA FINGERPRINT TO ENABLE ANALYSIS OF PREVIOUSLY AVAILABLE DATA

BACKGROUND

1. Technical Field

Present invention embodiments relate to computerized information analysis, and more specifically, to generating a fingerprint for data including data attributes, and utilizing the fingerprint for analysis of the data when the data is no longer available.

2. Discussion of the Related Art

Data may be stored for a predetermined duration for various purposes. For example, personal information (PI) may include information pertaining to patients, customers, suppliers, citizens, and/or employees. This information is processed in many different types of systems within an enterprise (e.g., Human Resource (HR) systems for employee information, Master Data Management (MDM) systems for customer, supplier or employee information, order entry systems (e.g., e-Commerce platforms), customer or supplier relationship management systems (e.g. SAP CRM, SAP SRM, Siebel CRM, etc.), and order fulfillment systems (e.g., ERP solutions)).

This type of information should be retained for a minimum time period sufficient to satisfy business requirements. Specifically, various regulations exist that demand deletion of this information after a required minimum time period, and provide strict guidelines with respect to persons and/or entities permitted to view and work with the information (e.g., HIPAA in the U.S.; Bundesdatenschutzgesetz (Germany's Federal Data Protection Act); Data Protection Act of 1984 (United Kingdom) covering storage of personal information (PI) only for a limited amount of time; European Union (EU) Directive 95/46/EC on the Protection of Personal Data covers three major areas related to personal information (PI), namely transparency, legitimate purpose, and proportionality, where the last aspect also covers consideration of maintaining personal information (PI) as long as minimally needed; this latter directive also mandates that personal information (PI) must be protected from loss, unauthorized disclosure, and modification while the information is in transit or at rest; etc.).

An unauthorized access or potential compromise of the personal information (PI) may occur prior to deletion of that information. When the potential compromise is detected after deletion of the personal information (PI), the scope and/or consequences of this type of occurrence (e.g., which information has been potentially compromised, which regulations apply, etc.) are difficult to determine due to the unavailability of the affected personal information (PI). This consequently hinders the ability to perform an analysis of the occurrence (e.g., the analysis may inadvertently expose regulated information to persons and/or entities beyond those prescribed by the regulations) and to comply with the appropriate regulations (e.g., since the particular regulations that apply are difficult to determine without the affected personal information (PI)).

BRIEF SUMMARY

According to one embodiment of the present invention, a system analyzes data in response to detecting occurrence of an event. The system includes a computer system including at least one processor. The system maps fields between the data and a fingerprint definition identifying relevant fields of the data to produce a fingerprint for the data including information pertaining to the data. The data is deleted after occurrence of the event. The produced fingerprint is stored in a data repository. The system retrieves the fingerprint from the data repository in response to detection of the event occurrence after the data has been deleted, and analyzes the information within the retrieved fingerprint to evaluate an impact of the event on corresponding deleted data. Embodiments of the present invention further include a method and computer program product for analyzing data in response to detecting occurrence of an event in substantially the same manner described above.

DETAILED DESCRIPTION

Present invention embodiments pertain to generating a fingerprint for data including data attributes, and utilizing the fingerprint for analysis of the data when the data is no longer available. The present invention embodiments are preferably applied with respect to sensitive data (e.g., personal information (PI) including information pertaining to patients, customers, suppliers, citizens and/or employees, etc.), but may be applied to any other data (e.g., non-sensitive data, etc.) that may become unavailable (e.g., information that is subject to deletion after retention for a minimum time interval (e.g., information subject to various regulations, etc.), information that becomes unavailable due to system outage, power failure, or other data loss, etc.). Alternatively, the fingerprint of present invention embodiments may be generated and utilized for any type of data (e.g., sensitive, non-sensitive, etc.) when the data is available.

The fingerprint can be created at the time the data is created and/or updated, or prior to the data becoming unavailable (e.g., prior to deletion of the data upon expiration of a minimal retention time period, etc.). The fingerprint is represented by a fingerprint record containing various attributes of the data, and preferably including for each data construct or message containing the data: the type of data (e.g., in the data construct or message, but not the actual values (e.g. indicates the presence or absence of values for data elements (e.g., address, telephone number, Social Security Number, etc.) in the data construct or message)); transaction metadata to identify data sources (e.g., a transaction identification or message control number); date; the system holding the information; and jurisdictional information (e.g., state and country). This information is utilized to analyze occurrence of an event affecting the data (e.g., unauthorized access or other potential compromise of the data, etc.).

If a notification is required in response to the event, the information in the fingerprints associated with the affected data may be used to generate and determine recipients of the notification. For example, the data may be encrypted with a public key of an escrow service (e.g., a key not known to the original systems producing, consuming, and delivering the data). When the need arises, metadata from a fingerprint is presented to the escrow service for further analysis (e.g., to obtain the actual data of persons and/or entities, etc.). In this case, the escrow service unlocks the data with a corresponding private key to determine recipients for the notification. Alternatively, the fingerprint may employ a link to a transaction identification that can be used to recover the data (e.g., actual information of persons and/or entities, etc.) from the corresponding data source (e.g., ensuring that the linking identification does not contain the actual data) to determine recipients for the notification.

Present invention embodiments provide the ability to identify and analyze data affected or impacted by an event (e.g., potential compromise of the data) even in instances where the data is no longer available (e.g., has been deleted after a minimal retention period, etc.). Further, applicable laws and regulations may be identified based on the location of the person and/or entity associated with affected data indicated in the fingerprint, where the fingerprinting may be adapted to the different laws and regulations. Moreover, present invention embodiments enable compliance with regulations dealing with information protection, and provide the ability to inform persons and/or entities affected by the event to enable the informed persons and/or entities to mitigate further impacts of the event.

Present invention embodiments may be utilized for various scenarios. For example, an event affecting personal information (PI) (e.g., potential compromise of the personal information (PI)) in a computing environment may be detected after the event occurrence (e.g., by browsing logs, audit files, or traces, or by debugging abnormal system behavior). However, the personal information (PI) is deleted after a last use and possibly before the detection, thereby being unavailable at the time of the event detection. Thus, at the time of the event detection, the particular information that might have been in the system at the time the event occurred, and the persons and/or entities affected, may be unclear.

Present invention embodiments employ fingerprints for the data to enable determination of the persons and/or entities associated with the data affected by the event, the data elements of data records that were affected, and the locations of the associated persons and/or entities to determine any applicable laws and regulations (even when the affected data is no longer available as in the above example scenarios). The associated persons and/or entities may be informed of the event to mitigate consequences of the affected data. In addition, the analysis of the affected data may be performed without directly inspecting the data, thereby assisting compliance with regulations prescribing the persons and/or entities permitted to view the data.

Figure 1:
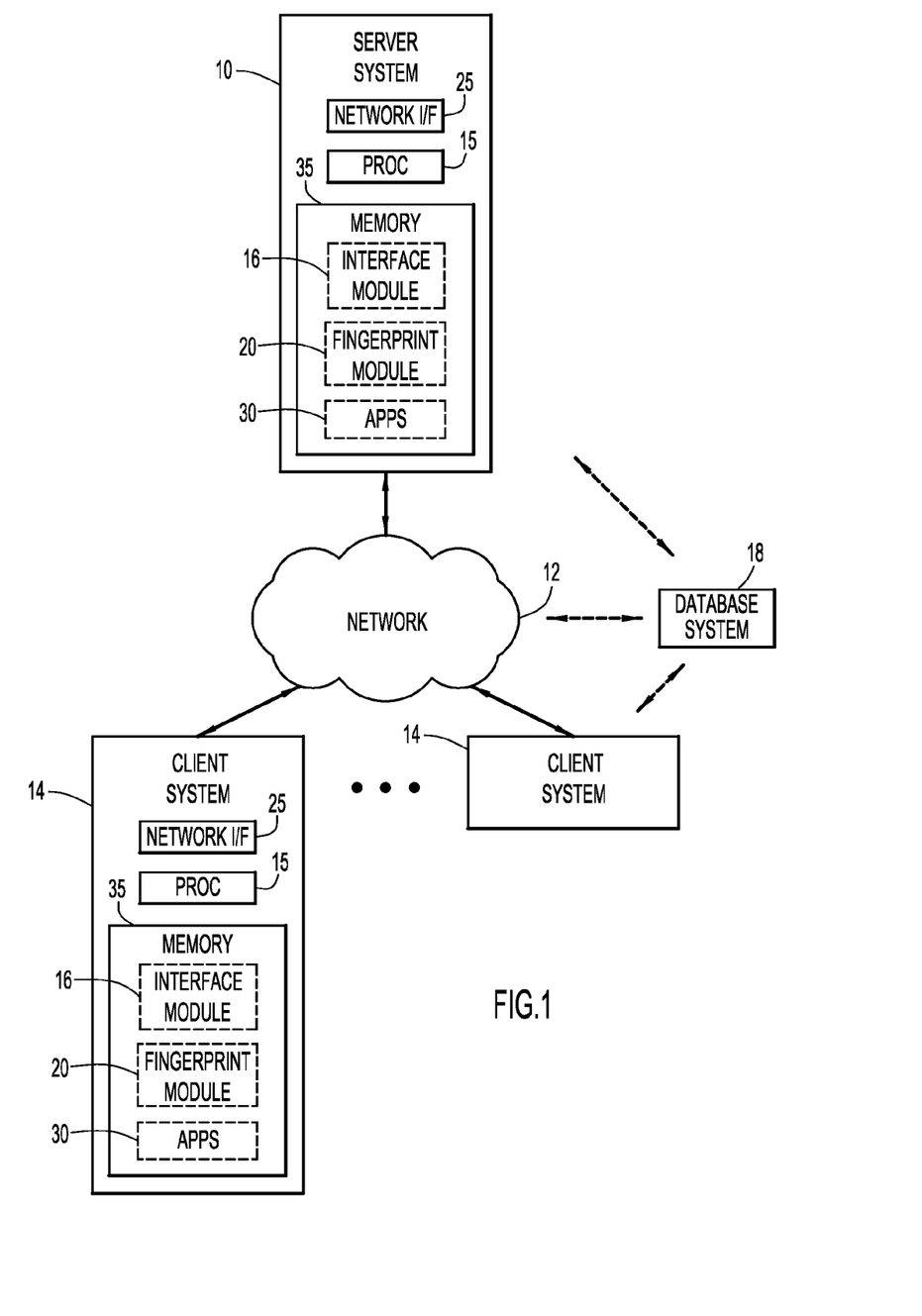
FIG. 1 is a diagrammatic illustration of an example computing environment for use with an embodiment of the present invention.

An example environment for use with present invention embodiments is illustrated in FIG. 1. Specifically, the environment includes one or more server systems 10, and/or one or more client systems 14. Server systems 10 and client systems 14 may be remote from each other and communicate over a network 12. The network may be implemented by any number of any suitable communications media (e.g., wide area network (WAN), local area network (LAN), Internet, Intranet, etc.). Alternatively, server systems 10 and client systems 14 may be local to each other, and communicate via any appropriate local communication medium (e.g., local area network (LAN), hardwire, wireless link, Intranet, etc.).

Client systems 14 enable users to provide information to server systems 10 to configure and initiate generation and analysis of fingerprints (e.g., indicate parameters, provide pre-defined definitions and mappings, etc.). Server systems 10 may enable generation and utilization of fingerprints to analyze corresponding data as described below. The server systems include an interface module 16 to initiate generation of fingerprints, a fingerprint module 20 to generate and process the fingerprints, and one or more applications 30 serving as producers and consumers of personal information (PI) and/or other data of interest for which fingerprints are generated.

A database system 18 may store various information for the fingerprint generation and analysis (e.g., generated fingerprints, fingerprint record definitions, metadata, definitions for mappings between data constructs and fingerprints, etc.). The database system may be implemented by any conventional or other database or storage unit, may be local to or remote from server systems 10 and client systems 14, and may communicate via any appropriate communication medium (e.g., local area network (LAN), wide area network (WAN), Internet, hardwire, wireless link, Intranet, etc.). The client systems may present a graphical user (e.g., GUI, etc.) or other interface (e.g., command line prompts, menu screens, etc.) to solicit information from and provide information to users pertaining to the fingerprint generation and desired analysis (e.g., generated fingerprints, fingerprint record definitions, metadata, definitions for mappings between data constructs and fingerprints, etc.), and may provide reports including analysis results (e.g., affected information, generated fingerprints, etc.).

Server systems 10 and client systems 14 may be implemented by any conventional or other computer systems preferably equipped with a display or monitor, a base (e.g., including at least one processor 15, one or more memories 35 and/or internal or external network interfaces or communications devices 25 (e.g., modem, network cards, etc.)), optional input devices (e.g., a keyboard, mouse or other input device), and any commercially available and custom software (e.g., server/communications software, interface module, fingerprint module, applications, browser/interface software, etc.).

Alternatively, one or more client systems 14 may generate and analyze fingerprints for corresponding data when operating as a stand-alone unit. In a stand-alone mode of operation, the client system stores or has access to information for fingerprint generation and analysis (e.g., generated fingerprints, fingerprint record definitions, metadata, definitions for mappings between data constructs and fingerprints, etc.), and includes interface module 16, fingerprint module 20, and/or applications 30 to generate and process the fingerprints. The client system may present a graphical user (e.g., GUI, etc.) or other interface (e.g., command line prompts, menu screens, etc.) to solicit information from and provide information to a corresponding user pertaining to the fingerprint generation and desired analysis (e.g., generated fingerprints, fingerprint record definitions, metadata, definitions for mappings between data constructs and fingerprints, etc.), and may provide reports including analysis results (e.g., affected information, generated fingerprints, etc.).

Thus, server and client systems 10, 14 may generate and analyze fingerprints in combination, where the various functions for fingerprint generation and analysis may be distributed between the server and client systems in any desired fashion. Alternatively, the server and client systems may each operate as a stand-alone unit. In a stand-alone mode of operation, the server and client systems each store or have access to the information to generate and analyze fingerprints.

Interface module 16 and fingerprint module 20 may include one or more modules or units to perform the various functions of present invention embodiments described below. The various modules (e.g., interface module, fingerprint module, etc.) may be implemented by any combination of any quantity of software and/or hardware modules or units, and may reside within memory 35 of the server and/or client systems for execution by processor 15.

In systems that manage personal information (PI) and/or other data of interest, the production of fingerprints may be inserted into a message flow. The structure of the messages is known, where a prerequisite mapping between the fields of the message structure and the corresponding fields for the fingerprint is performed. Once this mapping is performed for each message type within a message flow, the production of fingerprints can be produced as a microflow fingerprint repository.

Figure 2:
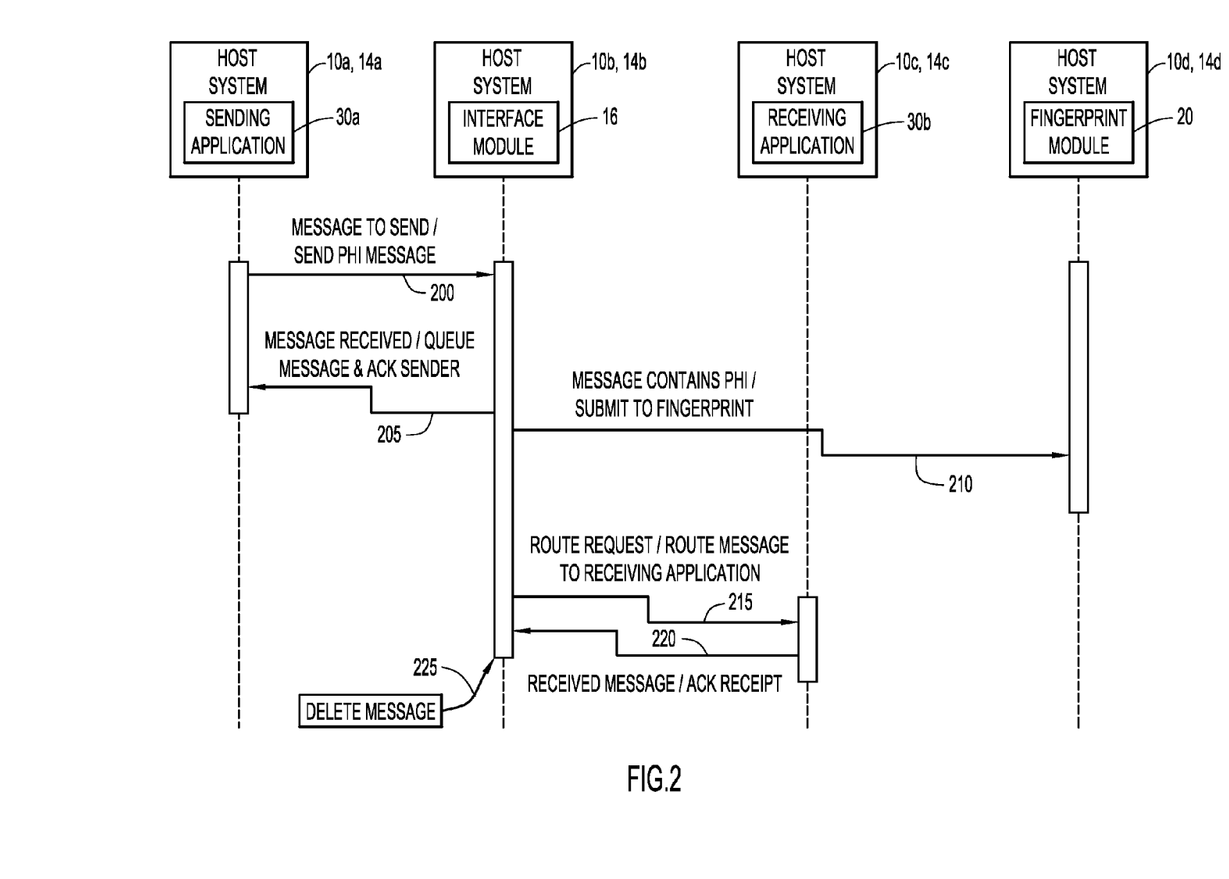
FIG. 2 is a flow diagram illustrating generation of a fingerprint for data during message processing according to an embodiment of the present invention.

A manner of generating a fingerprint for data during message processing according to an embodiment of the present invention is illustrated in FIG. 2. Initially, a sending application 30*a* (e.g., via a corresponding server system 10*a* and/or client system 14*a*) generates and transmits data intended for a receiving application 30*b* at flow 200. By way of example, the transmitted data is sent in the form of a message, and includes personal information (PI) (e.g., personal health information (PHI) as viewed in FIG. 2). However, the data may be transmitted within any desired data structure or construct.

Interface module 16 (e.g., via a corresponding server system 10*b* and/or client system 14*b*) receives and stores the message in a message queue, and generates and sends an acknowledgment to sending application 30*a* at flow 205. Since interface module 16 is positioned in the message flow for generation of the fingerprint, the interface module further transmits the received message including the personal information (PI) to fingerprint module 20 (e.g., via a corresponding server system 10*d* and/or client system 14*d*) at flow 210 in order to generate and store a fingerprint for the information contained in the message as described below. In addition, the interface module (e.g., via corresponding server system 10*b* and/or client system 14*b*) routes the message to receiving application 30*b* (e.g., via a corresponding server system 10*c* and/or client system 14*c*) at flow 215 to enable delivery of the message to the intended destination for processing.

Receiving application 30*b* (e.g., via corresponding server system 10*c* and/or client system 14*c*) receives the message, and generates and transmits an acknowledgement to interface module 16 at flow 220. The interface module (e.g., via corresponding server system 10*b* and/or client system 14*b*) discards the message received from sending application 30*a* and stored in the message queue at flow 225 in response to receiving the acknowledgement from receiving application 30*b*. The sending application, receiving application, interface module, and fingerprint module may reside on the same or different host systems (e.g., server systems 10 and client systems 14) in any desired arrangement or combinations.

Figure 3:
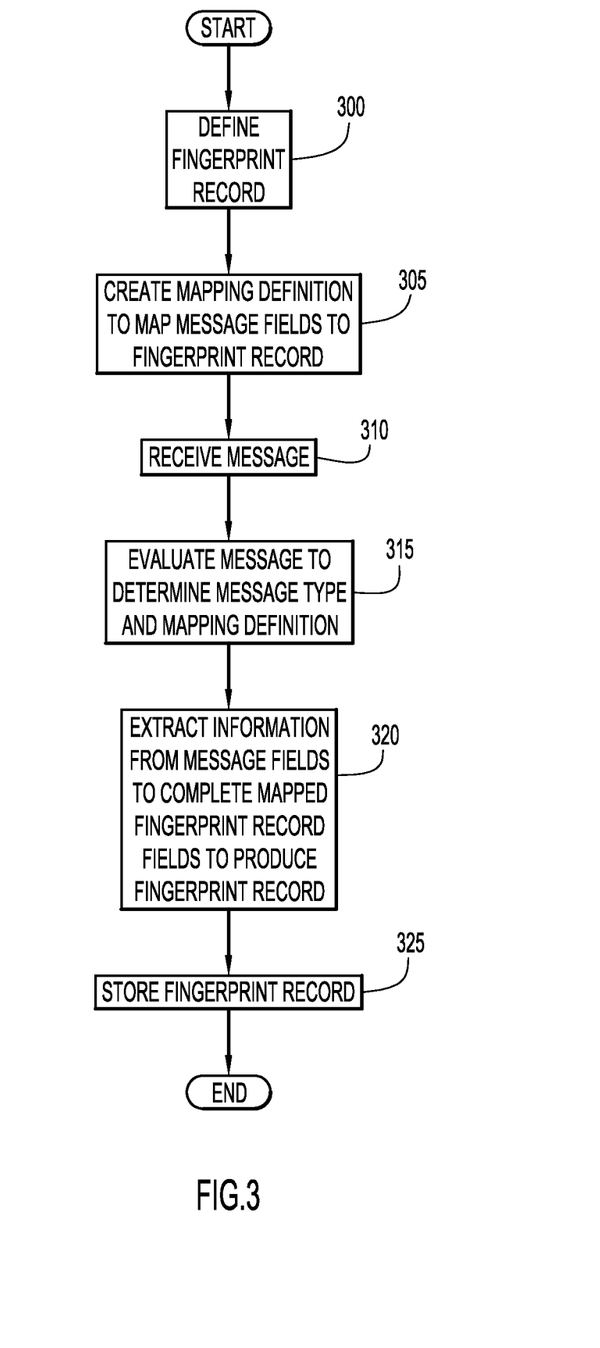
FIG. 3 is procedural flowchart illustrating a manner of generating a fingerprint for data according to an embodiment of the present invention.

A manner of generating a fingerprint (e.g., via fingerprint module 20 and a corresponding server system 10 and/or client system 14) is illustrated in FIG. 3. Initially, a fingerprint record definition is defined at step 300. In particular, specific fields of personal information (PI) and/or other data of interest within a data structure or construct employed by a given implementation or system are identified to form a fingerprint record definition representing a fingerprint for the data. In order to employ the fingerprint process, specific fields of the given system are examined to select candidate fields for inclusion into the fingerprint record definition. The criteria for this candidate field selection may vary based on the particular implementation. Generally, any field of the given system that contains personal information (PI) and/or other data of interest (by itself or in combination with one or more other fields) is a candidate for inclusion into the fingerprint record definition.

Accordingly, a fingerprint record definition is adaptable to the particular implementations or systems employing the fingerprint, and any applicable laws and regulations pertaining to the personal information (PI) and/or other data of interest. Fingerprint module 20 may utilize metadata (e.g., from server system 10, client system 14, and/or database system 18) to identify relevant fields in a data model of a data structure or construct containing the personal information (PI) and/or other data of interest for inclusion within the fingerprint record definition. The data model provides an overall format and arrangement of fields for the data structure or construct. The metadata basically describes information contained within the data model and fingerprint fields to enable the identification of the relevant fields for the fingerprint record definition. By way of example, the data structure or construct containing the personal information (PI) and/or other data of interest is preferably in the form of a message for transmission within a system. However, the data structure or construct may be any data structure or construct suitable to contain the personal information (PI) and/or other data of interest.

Further, a common model that can be mapped to a specific implementation or system may be utilized to identify the relevant fields for the fingerprint record definition. For example, in Service-Oriented Architecture (SOA) environments including common models for business objects deployed into an Enterprise Service Bus (ESB) with associated metadata, fingerprint module 20 may employ any conventional or other semantic-based mapping approaches (based on the metadata) to automatically determine the personal information (PI) and/or other data of interest of the common model for inclusion in the fingerprint record definition.

Alternatively, the fingerprint record definition may be pre-defined and accessible by fingerprint module 20. For example, an XML Schema Definition (XSD) may be employed that indicates the relevant fields of the message data model for inclusion within the fingerprint record definition. Moreover, the pre-defined fingerprint record definition may be entered by a user.

The fields of the fingerprint record definition indicate the presence or absence of values for the corresponding fields within a message (or other data construct) as described below. In addition, each fingerprint record definition includes fields for correlating metadata that links the fingerprint to the person and/or entity associated with the message (e.g., the date the message was received, the names of the systems that either produced or consumed the message, the general residential locality information of the person and/or entity referenced by the message, a unique identifier of the message, etc.).

Once a fingerprint record definition has been created, a mapping definition providing a mapping between fields of a message (or other data construct) definition and the fingerprint record definition is performed at step 305. The message definition basically defines the format and structure of a particular type of message in accordance with the message data model. Fingerprint module 20 may map fields within the message definition to corresponding fields in the fingerprint record definition based on metadata (e.g., from server systems 10, client systems 14, and/or database system 18) describing information contained within the message and fingerprint definition fields.

Further, a common model that can be mapped to a specific system or implementation may be utilized to map relevant fields of the common model to the fingerprint record definition. For example, in Service-Oriented Architecture (SOA) environments including common models for business objects deployed into an Enterprise Service Bus (ESB) with associated metadata, fingerprint module 20 may employ conventional or other semantic-based mapping approaches (based on the metadata) to automatically map the personal information (PI) and/or other data of interest within a message (e.g., HL7, etc.) definition (formed in accordance with the common model) to fields of the fingerprint record definition.

Alternatively, the mapping between the message definition and fingerprint record definition may be pre-determined and accessible by fingerprint module 20. For example, the pre-defined mapping may be entered by a user.

The mappings may be defined for each of a plurality of different message types with each message type associated with a corresponding message definition, where the defined mappings are stored in database system 18.

Once the fingerprint record and mapping definitions have been established, a given message may be evaluated for the purpose of producing a fingerprint. Accordingly, fingerprint module 20 (e.g., via corresponding server system 10 and/or client system 14) receives a message containing personal information (PI) and/or other data of interest at step 310, and evaluates the message at step 315 to form a fingerprint by completing the fields of a corresponding fingerprint record. In particular, fingerprint module 20 (e.g., via corresponding server system 10 and/or client system 14) evaluates the received message, and determines the message type to identify the appropriate mapping definition providing a mapping between the message and fingerprint record. The fingerprint record definition includes fields for correlating metadata that links the fingerprint to the person and/or entity that transmitted the message, and fields indicating the presence or absence of values for the corresponding or mapped fields within the received message (e.g., without containing the actual values from the received message).

An example fingerprint record definition characterizing field values in an HL7 version two message is illustrated in Table I below.

TABLE I

| Field ID | Field Name | Field Description |
| --- | --- | --- |
| 1 | external message identifier | Unique external message identifier |
| 2 | sending application | application that sent message |
| 3 | sending facility | facility that sent message |
| 4 | receiving application | application that was recipient of the message |
| 5 | receiving facility | facility that received message |
| 6 | message timestamp | timestamp of message |
| 7 | message control id | unique identifier for message generated by message sender |
| 8 | State | state of residence of patient |
| 9 | Zip | patient's zip code for place of residence |
| 10 | has patient name | Boolean value indicating population of field in the message |
| 11 | has patient phone number | Boolean value indicating population of field in the message |
| 12 | has fax number | Boolean value indicating population of field in the message |
| 13 | has email | Boolean value indicating population of field in the message |
| 14 | has social security number | Boolean value indicating population of field in the message |
| 15 | has medical record number | Boolean value indicating population of field in the message |
| 16 | has patient acct number | Boolean value indicating population of field in the message |
| 17 | has driver license number | Boolean value indicating population of field in the message |
| 18 | has date of birth | Boolean value indicating population of field in the message |
| 19 | has date of death | Boolean value indicating population of field in the message |
| 20 | has zip code | Boolean value indicating population of field in the message |
| 21 | has address | Boolean value indicating population of field in the message |
| 22 | has enterprise identifier | Boolean value indicating population of field in the message |
| 23 | has health plan benefit number | Boolean value indicating population of field in the message |
| 24 | has guarantor name | Boolean value indicating population of field in the message |
| 25 | has guarantor number | Boolean value indicating population of field in the message |
| 26 | has guarantor phone number | Boolean value indicating population of field in the message |
| 27 | has guarantor social security number | Boolean value indicating population of field in the message |
| 28 | has guarantor account number | Boolean value indicating population of field in the message |
| 29 | has guarantor employee id | Boolean value indicating population of field in the message |
| 30 | has guarantor date of birth | Boolean value indicating population of field in the message |
| 31 | has guarantor address | Boolean value indicating population of field in the message |
| 32 | has next of kin name | Boolean value indicating population of field in the message |
| 33 | has next of kin address | Boolean value indicating population of field in the message |
| 34 | has next of kin phone number | Boolean value indicating population of field in the message |
| 35 | has next of kin date of birth | Boolean value indicating population of field in the message |
| 36 | has next of kin contact name | Boolean value indicating population of field in the message |
| 37 | has next of kin contact phone | Boolean value indicating population of field in the message |
| 38 | has next of kin address | Boolean value indicating population of field in the message |
| 39 | has next of kin social security number | Boolean value indicating population of field in the message |

Fields one through nine of the fingerprint record definition of Table I serve as correlating metadata to indicate the participating systems and facilities, timestamp, and patient residence for linking the fingerprint to a person and/or entity. The remaining fields (e.g., fields 10 to 39) include information indicating the presence or absence of values for corresponding or mapped fields within a received message (e.g., a Boolean value of 1 or TRUE may be utilized to indicate the presence within the received message of a value for a corresponding or mapped field, while a Boolean value of 0 or FALSE may be utilized to indicate the absence within the received message of a value for a corresponding or mapped field).

Fingerprint module 20 (e.g., via corresponding server system 10 and/or client system 14) extracts and/or evaluates information within the received message according to the identified mapping definition in order to complete the fields of a fingerprint record at step 320. For example, values for correlating metadata are extracted and placed in the appropriate fields of the fingerprint record, while appropriate values are placed in the remaining fingerprint record fields to indicate the presence or absence of values for corresponding or mapped fields within the received message. An example fingerprint record produced in accordance with the fingerprint record definition of Table I in response to a received HL7 version two message containing data of interest is illustrated in Table II below.

TABLE II

| Field ID | Field Name | Field Value |
|---|---|---|
| 1 | external message identifier | 550e8400-e29b-41d4-a716-446655440000 |
| 2 | sending application | SNDAPP |
| 3 | sending facility | SNDFACILITY |
| 4 | receiving application | RCVAPP |
| 5 | receiving facility | RCVFACILITY |
| 6 | message timestamp | 9999330152845 |
| 7 | message control id | 2323423432 |
| 8 | State | NM |
| 9 | Zip | 11111 |
| 10 | has patient name | TRUE |
| 11 | has patient phone number | TRUE |
| 12 | has fax number | FALSE |
| 13 | has email | FALSE |
| 14 | has social security number | TRUE |
| 15 | has medical record number | TRUE |
| 16 | has patient acct number | FALSE |
| 17 | has driver license number | FALSE |
| 18 | has date of birth | TRUE |
| 19 | has date of death | FALSE |
| 20 | has zip code | TRUE |
| 21 | has address | TRUE |
| 22 | has enterprise identifier | TRUE |
| 23 | has health plan benefit number | FALSE |
| 24 | has guarantor name | FALSE |
| 25 | has guarantor number | FALSE |
| 26 | has guarantor phone number | FALSE |
| 27 | has guarantor social security number | FALSE |
| 28 | has guarantor account number | FALSE |
| 29 | has guarantor employee id | FALSE |
| 30 | has guarantor date of birth | FALSE |
| 31 | has guarantor address | FALSE |
| 32 | has next of kin name | FALSE |
| 33 | has next of kin address | FALSE |
| 34 | has next of kin phone number | FALSE |
| 35 | has next of kin date of birth | FALSE |
| 36 | has next of kin contact name | FALSE |
| 37 | has next of kin contact phone | FALSE |
| 38 | has next of kin address | FALSE |
| 39 | has next of kin social security number | FALSE |

Once a fingerprint has been produced through evaluation of a received message containing personal information (PI) and/or other data of interest, fingerprint module 20 (e.g., via corresponding server system 10 and/or client system 14) stores the fingerprint within a fingerprint repository (e.g., database system 18) for later retrieval and analysis at step 325.

Once a fingerprint record definition and corresponding mappings are established, the fingerprint generation (e.g., interface module 16 and fingerprint module 20) may be deployed at any desired points within a system where instances of the message (or other data construct) definition are encountered. For example, interface module 16 (FIG. 2) may be utilized on a server system 10 and/or client system 14 to broker healthcare transactions in a hospital environment, where the interface module further facilitates generation of the fingerprints as described above. Once deployed, fingerprints are generated for storage in the fingerprint repository as described above.

Personal information (PI) and/or other data of interest may be associated with a minimum retention time period. In this case, the information is deleted from storage upon expiration of the retention time period, thereby rendering the information unavailable. Alternatively, the information may be rendered unavailable for various other reasons (e.g., inadvertent deletion, loss due to power or other outages, system component failures, etc.). An event that affects or impacts the data (e.g., potential compromise of the data, etc.) may occur during time intervals when the data is still available. However, when the occurrence of the event is detected after the data becomes unavailable, the effects of the event are difficult to determine without the affected data. Accordingly, the produced fingerprints may be utilized to determine the effects or impact of the event and analyze the affected data (in the absence of that data).

Figure 4:
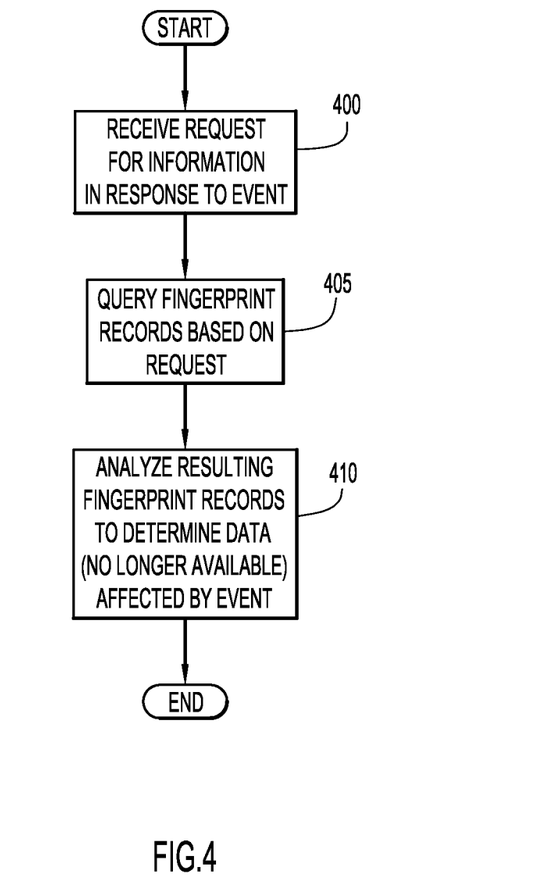
FIG. 4 is a procedural flowchart illustrating a manner of utilizing a fingerprint for analysis of data that is no longer available according to an embodiment of the present invention.

A manner of utilizing a fingerprint for analysis of data that is no longer available according to an embodiment of the present invention is illustrated in FIG. 4. Initially, fingerprint module 20 (e.g., via corresponding server system 10 and/or client system 14) receives a request for information at step 400 in response to detection of an occurrence of an event (e.g., potential compromise of the data, etc.) that affects personal information (PI) and/or other data of interest. Detection of the event could occur after the affected data becomes unavailable. The request may be received from interface module 16 (e.g., via corresponding server system 10 and/or client system 14) that may generate the request, and/or facilitate transfer of the request and/or resulting fingerprint information between fingerprint module 20 and one or more applications 30.

Fingerprint module 20 (e.g., via corresponding server system 10 and/or client system 14) queries the fingerprint repository (e.g., database system 18) to retrieve fingerprint records associated with the affected data at step 405. The fingerprint records are preferably queried based on one or more of the correlating metadata fields of the fingerprint records (e.g., the date and/or time the data was transmitted and/or received, the names of the systems that either produced or consumed the data, the general residential locality information of the person and/or entity referenced by the data, a unique identifier of the data, etc.). For example, the fingerprint records may be queried based on the reception time of the data to retrieve fingerprint records associated with the data that was present prior to occurrence of the event.

The resulting fingerprint records are analyzed at step 410 in order to determine the data affected by the event and initiate any appropriate actions (e.g., notifications, etc.). For example, in the case of the event including a potential compromise of personal information (PI) or other regulated information, the fingerprint record indicates the location of the indicated person and/or entity, thereby enabling determination of the applicable laws and regulations for the affected data. This may be utilized to perform appropriate actions (e.g., notifications, etc.) in response to the event for compliance with those regulations. Moreover, the fingerprint records indicate the presence of specific information within the affected data, thereby indicating the data elements affected by the event. In addition, since the fingerprint records do not contain actual values of the affected data (e.g., but indicate the presence of values), the analysis (of the fingerprint records) may be performed without risk of violating laws or regulations with respect to permitted viewing of the affected data.

In addition, the retrieved fingerprints may be utilized to retrieve (or recover) the actual personal information (PI) and/or other data of interest (e.g., after deletion) for further analysis. For example, in the case where notifications are required in response to occurrence of the event, the retrieved information may indicate the person and/or entity (and corresponding contact information) for sending the notification. In particular, the personal information (PI) and/or other data of interest may be encrypted with a public key of an escrow service (e.g., a key unknown to the original systems producing, consuming, and delivering the data). The escrow service may be implemented by a server system 10. Metadata from a corresponding retrieved fingerprint record may be presented to the escrow service (e.g., via interface module 16 and/or fingerprint module 20) in order to retrieve and decrypt (with an escrow service private key) the encrypted data for further analysis. With respect to notifications, the retrieved data may include the actual information for a person and/or entity (e.g., name, address, contact information, etc.) and be utilized to facilitate a notification of the event occurrence or other action.

Alternatively, the fingerprint record can include or be linked to a transaction identification. The source of the personal information (PI) and/or other data of interest may be provided with the transaction identification of a corresponding fingerprint record (e.g. via interface module 16 and/or fingerprint module 20) to retrieve the personal information (PI) and/or other data of interest for further analysis. With respect to notifications, the retrieved data may include the actual information for a person and/or entity (e.g., name, address, contact information, etc.) and be utilized to facilitate a notification of the event occurrence or other action.

The analysis of the fingerprint records (e.g., determining applicable laws, regulations, affected data elements, etc.) and performance of actions (e.g., retrieval of actual data of interest, notification, etc.) may be performed by interface module 16 and/or fingerprint module 20 (e.g., via corresponding server systems 10 and/or client systems 14). For example, the notification may be generated by fingerprint module 20 or manually by a user. The fingerprint and/or interface modules may automatically send the generated notification electronically in various manners (e.g., landline telephone, voice or text to a mobile telephone or hand-held computing device, facsimile, electronic mail, etc.). Alternatively, the generated notification may be sent manually by a user.

It will be appreciated that the embodiments described above and illustrated in the drawings represent only a few of the many ways of implementing embodiments for generating and utilizing a data fingerprint to enable analysis of previously available data.

The environment of the present invention embodiments may include any number of computer or other processing systems (e.g., client systems, server systems, etc.) and databases or other repositories arranged in any desired fashion, where the present invention embodiments may be applied to any desired type of computing environment (e.g., cloud computing, client-server, network computing, mainframe, stand-alone systems, etc.). The computer or other processing systems employed by the present invention embodiments may be implemented by any number of any personal or other type of computer or processing system (e.g., IBM-compatible, laptop, PDA, mobile devices, etc.), and may include any commercially available operating system and any combination of commercially available and custom software (e.g., browser software, communications software, server software, interface module, fingerprint module, applications, escrow service modules, etc.). These systems may include any types of monitors and input devices (e.g., keyboard, mouse, voice recognition, etc.) to enter and/or view information.

It is to be understood that the software (e.g., interface module, fingerprint module, etc.) of the present invention embodiments may be implemented in any desired computer language and could be developed by one of ordinary skill in the computer arts based on the functional descriptions contained in the specification and flowcharts illustrated in the drawings. Further, any references herein of software performing various functions generally refer to computer systems or processors performing those functions under software control. The computer systems of the present invention embodiments may alternatively be implemented by any type of hardware and/or other processing circuitry.

The various functions of the computer or other processing systems may be distributed in any manner among any number of software and/or hardware modules or units, processing or computer systems and/or circuitry, where the computer or processing systems may be disposed locally or remotely of each other and communicate via any suitable communications medium (e.g., LAN, WAN, Intranet, Internet, hardwire, modem connection, wireless, etc.). For example, the functions of the present invention embodiments may be distributed in any manner among the various client and server systems, and/or any other intermediary processing devices. The software and/or algorithms described above and illustrated in the flowcharts may be modified in any manner that accomplishes the functions described herein. In addition, the functions in the flowcharts or description may be performed in any order that accomplishes a desired operation.

The software of the present invention embodiments (e.g., interface module, fingerprint module, etc.) may be available on a recordable or computer useable medium (e.g., magnetic or optical mediums, magneto-optic mediums, floppy diskettes, CD-ROM, DVD, memory devices, etc.) for use on stand-alone systems or systems connected by a network or other communications medium.

The communication network may be implemented by any number of any type of communications network (e.g., LAN, WAN, Internet, Intranet, VPN, etc.). The computer or other processing systems of the present invention embodiments may include any conventional or other communications devices to communicate over the network via any conventional or other protocols. The computer or other processing systems may utilize any type of connection (e.g., wired, wireless, etc.) for access to the network. Local communication media may be implemented by any suitable communication media (e.g., local area network (LAN), hardwire, wireless link, Intranet, etc.).

The system may employ any number of any conventional or other databases or database systems, data stores or storage structures (e.g., files, databases, database systems, data structures, data or other repositories, queues, etc.) to store information (e.g., fingerprints, mapping and fingerprint definitions, data constructs or messages, etc.). The database system may be implemented by any number of any conventional or other databases, data stores or storage structures (e.g., files, databases, data structures, data or other repositories, etc.) to store information (e.g., generated fingerprints, fingerprint record definitions, metadata, definitions for mappings between data constructs and fingerprints, etc.). The database system may be included within or coupled to the server and/or client systems. The database systems and/or storage structures may be remote from or local to the computer or other processing systems, and may store any desired data (e.g., generated fingerprints, fingerprint record definitions, metadata, definitions for mappings between data constructs and fingerprints, etc.).

The data of interest and fingerprint may be stored within any conventional or other data structures (e.g., files, arrays, lists, stacks, queues, records, etc.), and may be stored in any desired storage unit (e.g., database, data or other repositories, queue, etc.). The data construct or message containing the data of interest may include any desired format and arrangement, and may include any quantity of any types of fields of any size to store the data. The definition and data model for the data construct or message may indicate the overall structure in any desired fashion (e.g., computer-related languages, graphical representation, listing, etc.).

The fingerprint (or fingerprint record) may include any desired format and arrangement, and may include any quantity of any types of fields of any size to store any desired data. The fields may indicate the presence, absence, actual values, or any other desired characteristics of the data of interest (e.g., quantity, value ranges, etc.). The fingerprint record may include all or any desired portion (e.g., any quantity of specific fields) of personal information (PI) or other data of interest within a given implementation or system. The fingerprint record definition may indicate the overall record structure in any desired fashion (e.g., computer-related languages, graphical representation, listing, etc.). The fields for the fingerprint record definition may be selected automatically (e.g., based on metadata, common or pre-defined models or structures, etc.) or manually (e.g., pre-defined, etc.) in any desired fashion for a particular implementation or system. The metadata (e.g., for field selection, common model, etc.) may include any suitable information providing a description of fields or information (e.g., description of content, data type, etc.).

The mapping definition may indicate the mapping between the data construct and fingerprint record in any desired fashion (e.g., computer-related languages, graphical representation, listing, etc.). The mapping may be performed automatically (e.g., based on metadata, common or pre-defined models or structures, etc.) or manually (e.g., pre-defined, etc.) in any desired fashion. The metadata (e.g., for mapping, common model, etc.) may include any suitable information providing a description of fields or information (e.g., description of content, data type, etc.).

The fingerprints may be queried based on any information within or associated with (e.g., metadata) the fingerprint record. The fingerprints may be any identifiers, and include any information (e.g., sensitive, non-sensitive, etc.) for analysis of the associated data. All or any desired portion of the data of interest may be encrypted/decrypted in any fashion (e.g., public/private keys, etc.) and/or linked by any identifier for later retrieval for further analysis.

The event may include any desired event that somehow affects or has the potential to compromise the data of interest. The event may be detected in any desired fashion (e.g., logs, traces, notifications, etc.). Present invention embodiments may provide any suitable notifications or perform other actions (e.g., restore data, create a log of the occurrence, determine applicable laws or regulations and perform actions to comply with those regulations, etc.) in response to occurrence of the event.

The present invention embodiments may employ any number of any type of user interface (e.g., Graphical User Interface (GUI), command-line, prompt, etc.) for obtaining or providing information (e.g., generated fingerprints, fingerprint record definitions, metadata, definitions for mappings between data constructs and fingerprints, etc.), where the interface may include any information arranged in any fashion. The interface may include any number of any types of input or actuation mechanisms (e.g., buttons, icons, fields, boxes, links, etc.) disposed at any locations to enter/display information and initiate desired actions via any suitable input devices (e.g., mouse, keyboard, etc.). The interface screens may include any suitable actuators (e.g., links, tabs, etc.) to navigate between the screens in any fashion.

The report may include any information arranged in any fashion, and may be configurable based on rules or other criteria to provide desired information to a user (e.g., affected data, generated fingerprints, etc.).

The present invention embodiments are not limited to the specific tasks or algorithms described above, but may be utilized for fingerprint generation and analysis of various types of data, even in the absence of that data. For example, present invention embodiments may be utilized for any types of data of interest (e.g., sensitive data (e.g., personal information (PI) including information pertaining to patients, customers, suppliers, citizens and/or employees, etc.), non-sensitive data, data that may become unavailable (e.g., information that is subject to deletion after retention for a minimum time interval (e.g., information subject to various regulations, etc.), information that becomes unavailable due to system outage, power failure, or other data loss, etc.), etc.). Further, present invention embodiments may generate and utilize any quantity of fingerprints for a data construct containing data of interest. The fingerprints may be utilized in the presence or absence of the associated data (e.g., prior to or subsequent deletion of the data, etc.).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises", "comprising", "includes", "including", "has", "have", "having", "with" and the like, when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A system for analyzing data in response to detecting occurrence of an event comprising:
    a computer system including at least one processor configured to:
        map fields between the data and a fingerprint definition identifying relevant fields of the data to produce a fingerprint for the data including information pertaining to the data, wherein the data is deleted after occurrence of the event and the fingerprint information lacks actual values for elements within the corresponding deleted data;
        store the produced fingerprint in a data repository;
        retrieve the fingerprint from the data repository in response to detection of the event occurrence after the data has been deleted; and
        analyze the information within the retrieved fingerprint to identify the elements of the corresponding deleted data and to evaluate an impact of the event on the corresponding deleted data.

2. The system of claim 1, wherein the data includes sensitive data subject to one or more regulations pertaining to access of the data.

3. The system of claim 2, wherein the fingerprint includes locality information, and analyzing the information includes:
    determining one or more regulations applicable to the corresponding deleted data based on the locality information in the retrieved fingerprint.

4. The system of claim 1, wherein the data is recoverable after deletion based on the fingerprint information, and the at least one processor is further configured to:
    retrieve the data based on information from the retrieved fingerprint for further analysis.

5. The system of claim 4, wherein the at least one processor is further configured to:
    analyze the retrieved data to facilitate generation and transmission of a notification of the occurrence of the event to a recipient indicated by the retrieved data.

6. The system of claim 4, wherein the data is encrypted and stored by an escrow system, and retrieving the data includes:
    providing information from the retrieved fingerprint to the escrow system to initiate decryption of the encrypted data.

7. The system of claim 4, wherein the fingerprint information includes a transaction identifier, and retrieving the data includes:
    providing the transaction identifier from the retrieved fingerprint to a source supplying the data in order to retrieve the data.

8. The system of claim 1, wherein the fingerprint information indicates the presence of values for elements within the corresponding deleted data in order to identify the elements of the corresponding deleted data impacted by occurrence of the event.

9. The system of claim 1, wherein the occurrence of the event potentially compromises the data.

10. A computer program product for analyzing data in response to detecting occurrence of an event comprising:
    a memory device having computer readable program code embodied therewith, the computer readable program code comprising computer readable program code configured to:
        map fields between the data and a fingerprint definition identifying relevant fields of the data to produce a fingerprint for the data including information pertaining to the data, wherein the data is deleted after occurrence of the event and the fingerprint information lacks actual values for elements within the corresponding deleted data;
        store the produced fingerprint in a data repository;
        retrieve the fingerprint from the data repository in response to detection of the event occurrence after the data has been deleted; and
        analyze the information within the retrieved fingerprint to identify the elements of the corresponding deleted data and to evaluate an impact of the event on the corresponding deleted data.

11. The computer program product of claim 10, wherein the data includes sensitive data subject to one or more regulations pertaining to access of the data.

12. The computer program product of claim 11, wherein the fingerprint includes locality information, and analyzing the information includes:
    determining one or more regulations applicable to the corresponding deleted data based on the locality information in the retrieved fingerprint.

13. The computer program product of claim 10, wherein the data is recoverable after deletion based on the fingerprint information, and the computer readable program code further comprises computer readable program code configured to:
    retrieve the data based on information from the retrieved fingerprint for further analysis.

14. The computer program product of claim 13, wherein the computer readable program code further comprises computer readable program code configured to:
    analyze the retrieved data to facilitate generation and transmission of a notification of the occurrence of the event to a recipient indicated by the retrieved data.

15. The computer program product of claim 13, wherein the data is encrypted and stored by an escrow system, and retrieving the data includes:
    providing information from the retrieved fingerprint to the escrow system to initiate decryption of the encrypted data.

16. The computer program product of claim 13, wherein the fingerprint information includes a transaction identifier, and retrieving the data includes:
    providing the transaction identifier from the retrieved fingerprint to a source supplying the data in order to retrieve the data.

17. The computer program product of claim 10, wherein the fingerprint information indicates the presence of values for elements within the corresponding deleted data in order to identify the elements of the corresponding deleted data impacted by occurrence of the event.

18. The computer program product of claim 10, wherein the occurrence of the event potentially compromises the data.

* * * * *